United States Patent [19]

Taguchi et al.

[11] Patent Number: 5,114,526
[45] Date of Patent: May 19, 1992

[54] FILM BONDING APPARATUS

[75] Inventors: Hiroshi Taguchi, Tokyo; Youji Washizaki, Saitama; Akira Igarashi, Tokyo; Hiroyoshi Nakano, Saitama, all of Japan

[73] Assignee: Somar Corporation, Tokyo, Japan

[21] Appl. No.: 589,107

[22] Filed: Sep. 27, 1990

[30] Foreign Application Priority Data

Apr. 6, 1990 [JP] Japan ................................. 2-91554

[51] Int. Cl.⁵ ............................................. B32B 31/00
[52] U.S. Cl. .................................... 156/361; 156/521; 156/552; 226/95
[58] Field of Search ............... 156/521, 522, 361, 552; 226/95

[56] References Cited

U.S. PATENT DOCUMENTS

| | | | |
|---|---|---|---|
| 3,037,557 | 6/1962 | Faeber et al. | 226/95 |
| 4,717,441 | 1/1988 | Seki et al. | 156/521 |
| 4,844,758 | 7/1989 | Hamamura et al. | 156/361 |
| 4,964,937 | 10/1990 | Seki | 156/521 |

Primary Examiner—David A. Simmons
Assistant Examiner—Robert Barker
Attorney, Agent, or Firm—Sughrue, Mion, Zinn, Macpeak & Seas

[57] ABSTRACT

A film bonding apparatus in which a film cut to a length corresponding to that of a base plate is bonded to the surface of the plate by the application of heat and pressure with a bonding roller. The film is provided from a continuous roll and is cut to appropriate size, the trailing edge of the film being held tightly to avoid film wrinkling or air bubbles by the suction action of an edge holding member whose effective length is not less than the maximum width of the films to be bonded by the apparatus. The holding member is moveable, at a speed equal to or slightly less than the rotative circumferential velocity of the pressure roller, the speed being automatically adjusted to maintain appropriate tension on the film. Coordinated movement between the film holding member and the pressure roller is provided by a gear mechanism.

2 Claims, 12 Drawing Sheets

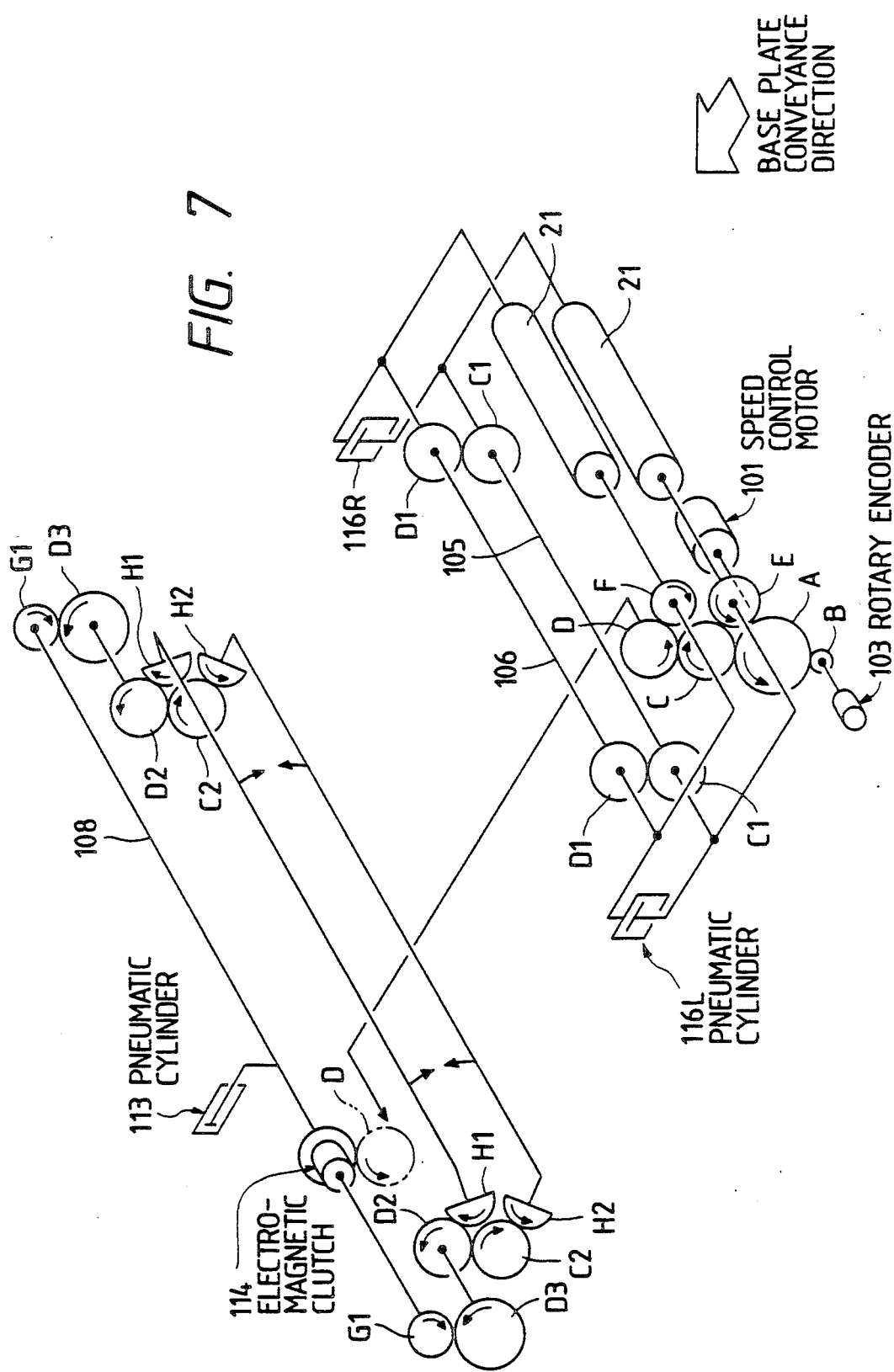

FILM BONDING APPARATUS

BACKGROUND OF THE INVENTION

1. Field of the Invention

The present invention relates to a bonding apparatus, particularly to a bonding apparatus by which a stratified film consisting of a photosensitive resin layer and a light-transmissible resin film is bonded, under pressure, to a base plate or a panel for a printed circuit board.

2. Description of the Background

In a conventional bonding apparatus, stratified films are sequentially bonded to base plates for printed circuit boards, respectively, as the base plates are sequentially conveyed on a roller conveyor or the like and a continuous stratified film is cut off to make each bonded film have a length corresponding to that of the base plate. Before the continuous stratified film is cut off, it is bonded to the base plate while a tension is applied to the film. Since the unbonded portion of the cut-off film is free to sag due to the effect of gravity on that portion, an air bubble may be produced between the bonded film and the base plate; alternatively the film may be wrinkled. In order to prevent such phenomena, film trailing edge holding members, each of which is a vacuum suction bar having a film sucking function, are provided at the peripheral portions of upper and lower heat and pressure bonding rollers so as to hold the trailing edge portions of the cut-off films and apply a tension to those portions. The film trailing edge holding members are moved by pneumatic cylinders, completely independently of means for rotating the heat and pressure bonding rollers. An art relating to the film trailing edge holding members is described in the Japanese Patent Application (OPI) No. 205140/86 (the term "OPI" as used herein means an "unexamined published application").

In the conventional art mentioned above, the rotative circumferential velocity of the heat and pressure bonding roller, which is equal to the speed of the bonding of the stratified film to the base plate, needs to be changed if the efficiency of the bonding is to be enhanced by increasing the velocity. When the rotative circumferential velocity of the roller is changed, the speed of the movement of the film trailing edge holding member needs to be changed depending on the circumferential velocity of the roller after the velocity is determined. This is a first problem. If the bonding apparatus is so large in size as to be capable of bonding a film of large width to a base plate, the film trailing edge holding member and the pneumatic cylinders need to be so large in size and weight that it is difficult to smoothly move them. This is a second problem. If the width of the stratified film to be bonded to the base plate is small, the sucking force of the film trailing edge holding member on the film is reduced so that the member cannot hold the film, thus making it likely that an air bubble is made between the bonded film and the base plate or and the film is wrinkled. This is a third problem.

The present invention was made in order to solve these three and other problems. Accordingly, it is an object of the present invention to reduce the likelihood that an air bubble is made between a film and a base plate or that the film is wrinkled.

It is another object of the present invention to automatically change the speed of the movement of a film trailing edge holding member depending on the rotative circumferential velocity of a heat and pressure bonding roller.

It is yet another object of the present invention to hold the rear edge of a film, regardless of the width of the film, when the film is bonded to a base plate or a panel.

The above-mentioned and other objects and novel features of the present invention will be apparent from the description herein and the drawings attached hereto.

The above-mentioned problems are solved by providing a bonding apparatus in which a pressure bonding roller is provided so that a film having a length corresponding to that of a base plate or a panel is bonded to the film bonding surface of the base plate by the roller; a film trailing edge holding member is rotatably supported near the peripheral surface of the roller; and the holding member holding the trailing edge portion of the film cut off to the desired length is moved to a position near the mutual contact surfaces of the roller and the film on the base plate or the panel, at a speed equal to or slightly less than the rotative circumferential velocity of the roller. The bonding apparatus is characterized by a film trailing edge holding member movement speed control means for automatically changing the speed of the movement of the holding member depending on the rotative circumferential velocity of the pressure bonding roller. The bonding apparatus may be characterized further in that the film trailing edge holding member movement speed control means includes gears for driving the pressure bonding roller, gears engaged with the former gears so as to move the film trailing edge holding member, and a coupling means for coupling the rotary shaft of the member to the latter gears so that the rotary shaft can be uncoupled therefrom. The bonding apparatus may be characterized in that the film trailing edge holding member movement speed control means includes a motor for moving the film trailing edge holding member, and a motor rotation speed control means for automatically changing the rotation speed of the motor depending on the rotative circumferential velocity of the pressure bonding roller. Since the speed control means for automatically changing the speed of the movement of the film trailing edge holding member depends on the rotative circumferential velocity of the pressure bonding roller and is provided in the bonding apparatus mentioned above, the speed of the movement of the holding member can be automatically changed depending on the rotative circumferential velocity of the roller, to reduce the likelihood that an air bubble is made between the film and the base plate or that the film is wrinkled.

The above-mentioned problems also are solved by providing a bonding apparatus in which a pressure bonding roller is provided so that a film having a length corresponding to that of a base plate is bonded to the film bonding surface of the base plate by the roller; a film trailing edge holding member is rotatably supported near the peripheral surface of the roller; and the member holding the trailing edge portion of the film cut off to the desired length is moved to a position near the mutual contact surfaces of the roller and the film on the base plate, at a speed equal to or slightly less than the rotative circumferential velocity of the roller. The bonding apparatus is characterized in that the film trailing edge holding member has a plurality of internal chambers communicating with mutually-independent suction units, respectively. The bonding apparatus may be characterized further in that the effective length of the film trailing edge holding member is not less than the maximum width of films to be bonded by the apparatus; and the longitudinal edge portion of the holding member, which is located nearer the position of the bonding of the film than the other longitudinal edge portion of the member, is shaped as a wedge.

The above-mentioned problems are solved by providing a bonding apparatus in which a pressure bonding roller is provided so that a film having a length corresponding to that of a base plate is bonded to the film bonding surface of the base plate by the roller; a film trailing edge holding member is rotatably supported near the peripheral surface of the roller; and the member holding the trailing edge portion of the film cut off to the desired length is moved to a position near the mutual contact surfaces of the roller and the film on the base plate, at a speed equal to or slightly less than the rotative circumferential velocity of the roller. The bonding apparatus is characterized in that the film trailing edge holding member has an internal chamber which is provided with suction holes communicating with a suction unit and is divided into a plurality of small internal chambers which enable the holding member to cope with various widths of films. The bonding apparatus may be characterized further in that the effective length of the film trailing edge holding member is not less than the maximum width of films to be bonded by the apparatus; and the longitudinal edge portion of the bonding member, which is located nearer the position of the bonding of the film than the other longitudinal edge portion of the member, is shaped as a wedge.

Since the film trailing edge holding member of the bonding apparatus mentioned above has the plural internal chambers communicating with the mutually-independent suction units, respectively, or has the internal chamber which is provided with the suction holes communicating with the suction unit and is divided into the plural small internal chambers which enable the holding member to cope with various widths of films, selected ones of the internal chambers can be put into sucking action depending on the width of the film to be bonded to the base plate. For that reason, the trailing edge portion of the film can be held by the holding member, regardless of the width of the film, to reduce the likelihood that an air bubble is made between the film and the base plate or that the film is wrinkled. Since the effective length of the film trailing edge holding member is not less than the maximum width of films to be bonded by the apparatus and the longitudinal edge portion of the member, which is located nearer the position of the bonding of the film than the other longitudinal edge portion of the member, is shaped as a wedge, the member can hold the trailing edge of the film until the trailing edge reaches a position nearer the pressure bonding roller, to reduce the likelihood that an air bubble is made between the film and the base plate that the film is wrinkled.

BRIEF DESCRIPTION OF THE DRAWINGS

FIG. 7 is a view for describing the operation of the heat and pressure bonding roller and film trailing edge holding member of the bonding apparatus;

DESCRIPTION OF THE PREFERRED EMBODIMENTS

Embodiments of the present invention are hereafter described in detail with reference to the drawings attached hereto.

Figure 1:
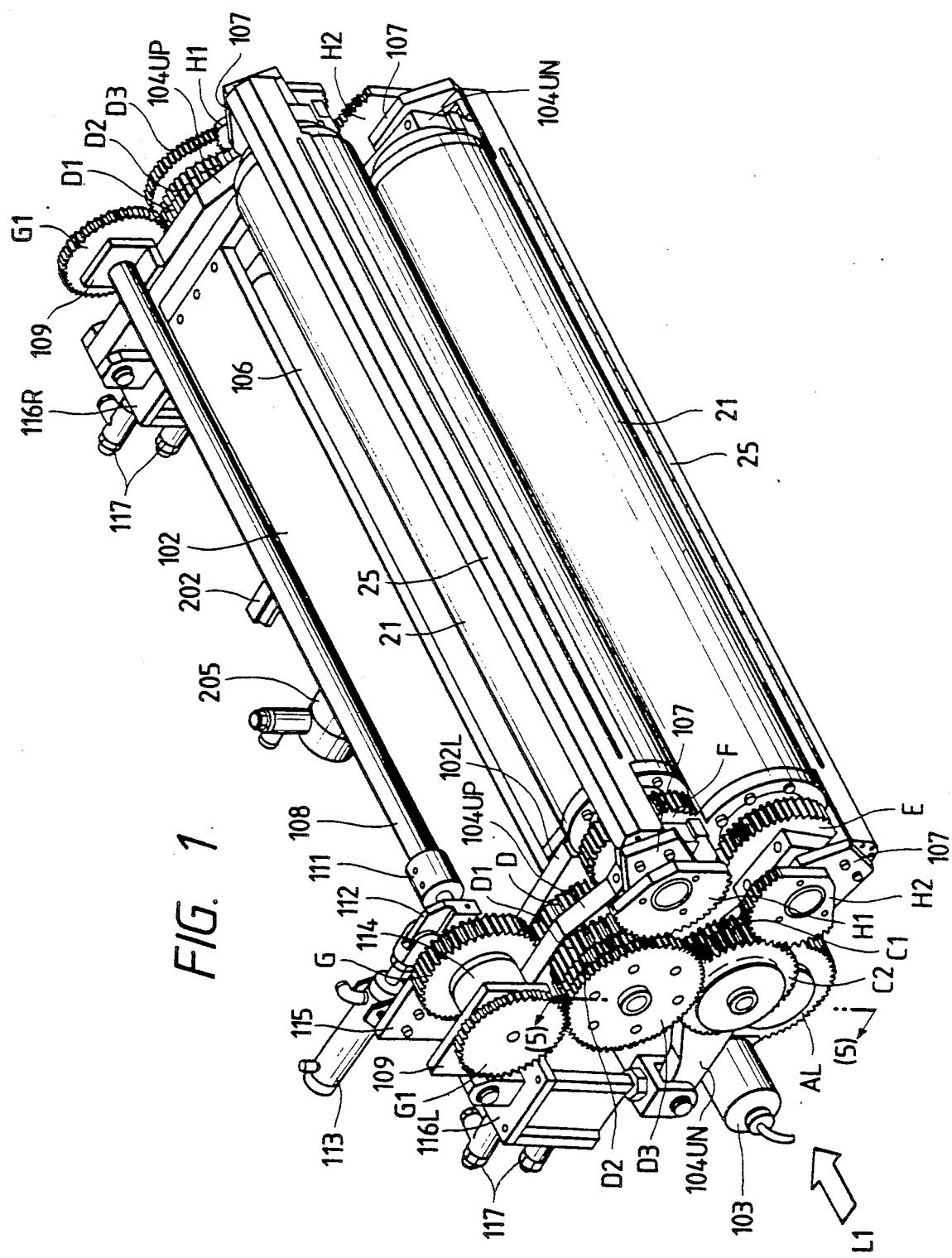
FIG. 1 is a perspective view of the film trailing edge holding member section of a bonding apparatus which is an embodiment of the present invention and by which stratified films each consisting of a photosensitive resin layer and a light-transmissible resin film are bonded, under heat and pressure, to the top and bottom of a base plate for a printed circuit board.
Figure 2:
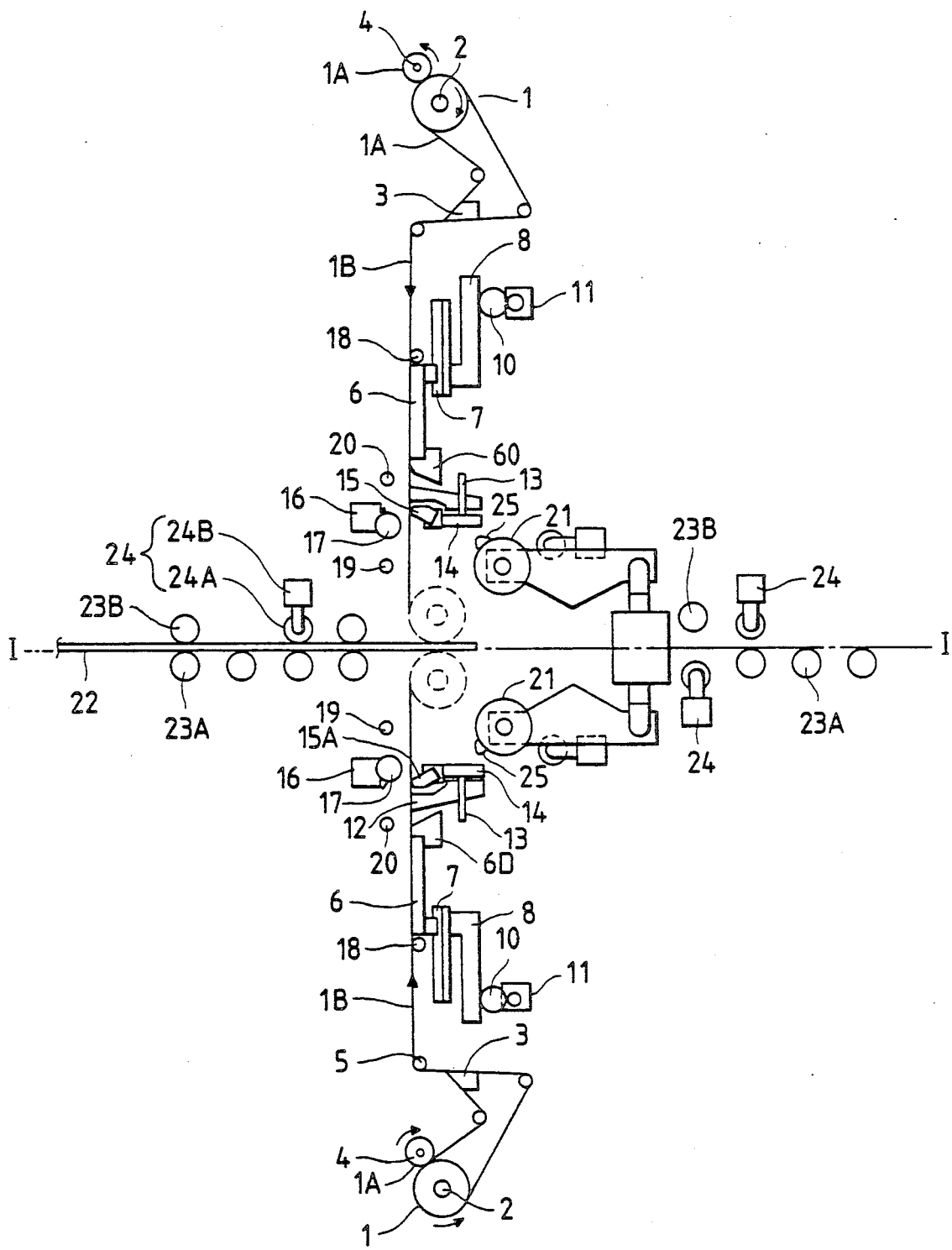
FIG. 2 is a view for describing the outline of the constitution of the bonding apparatus.
Figure 3:
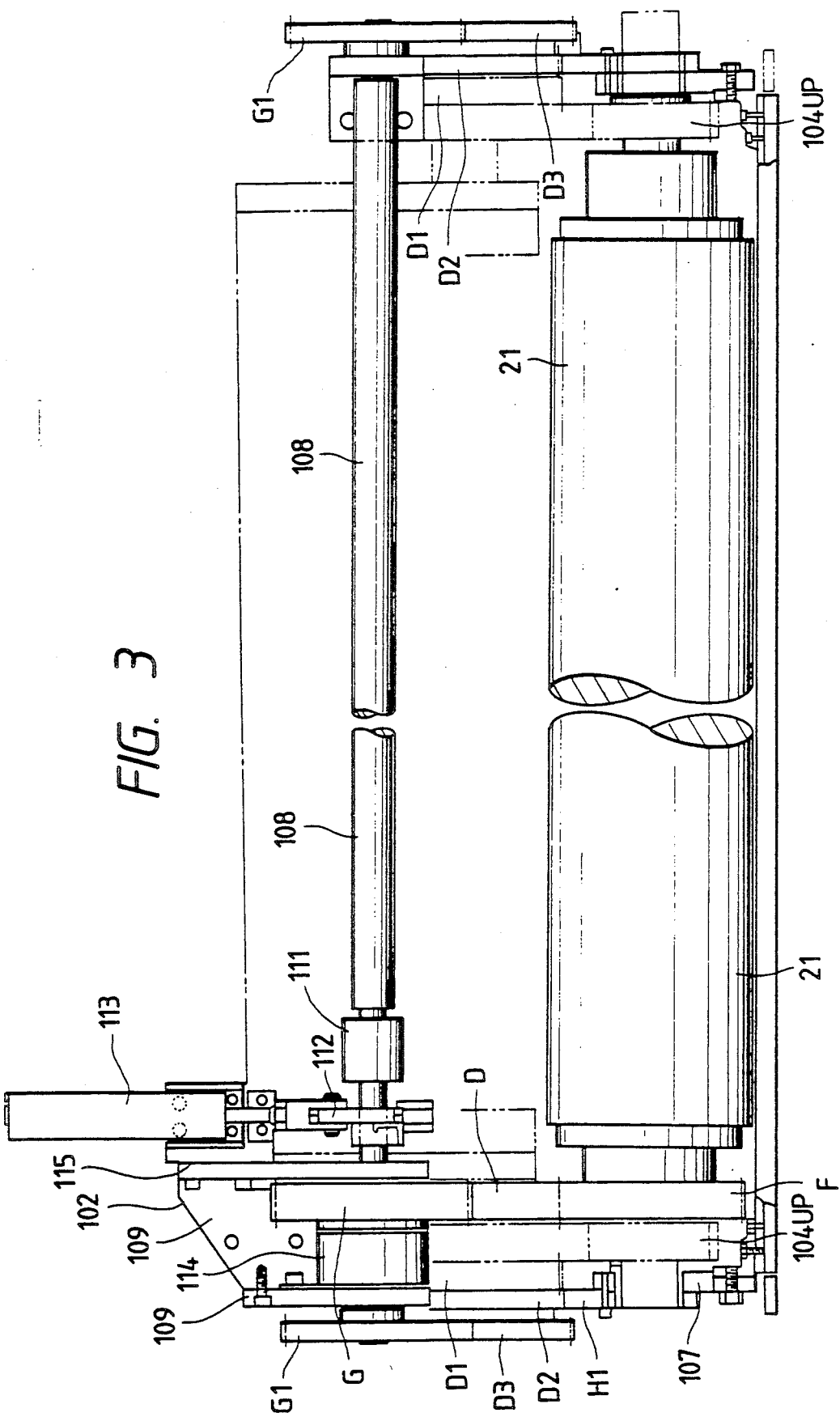
FIG. 3 is a plan view of the film trailing edge holding member section.

FIG. 1 provides perspective view of the film trailing edge holding member section of a film bonding apparatus which is one of the embodiments and by which stratified films each consisting of a photosensitive resin layer and a light-transmissible resin film are bonded, under heat and pressure, to the top and bottom of a base plate or a panel for a printed circuit board, respectively. FIG. 2 is a schematic view of the bonding apparatus.

In the illustrated bonding apparatus, continuous stratified three-layer films 1 each consisting of the light-transmissible resin film, the photosensitive resin layer and another light-transmissible resin film are continuously wound on supply rollers 2 in advance, as shown in FIG. 2. Each of the continuous stratified films 1 from the supply rollers 2 is separated, by a film separation member 3, into the light-transmissible resin film 1A as a protective film and the stratified film 1B consisting of the other light-transmissible resin film and the photosensitive resin layer exposed on its side to be bonded to the base plate. The effective length of the film separation member 3 is not less than the maximum width of the stratified films to be bonded by the apparatus. Since the film separation longitudinal edge portion of the film separation member 3 is shaped as a wedge, the resistance to the separation of the stratified film by the member is low and the fluctuation of the point of the separation is small so that the separation can be smoothly performed.

The separated light-transmissible resin film 1A is wound on a winding roller 4. A pair of such winding rollers 4 are provided over and under a base plate conveyance passage I—I as well as the supply rollers 2.

The leading edge of the separated stratified film 1B is fed to a main vacuum suction plate 6, which is a film feed member, along a tension roller 5, as shown in FIG. 2. A static electricity eliminator 18 is provided near the main vacuum suction plate 6 so as to eliminate static electricity from the stratified film 1B.

The main vacuum suction plate 6 is vertically moved toward and away from the position of the bonding of the stratified film. For the vertical movement, the plate 6 is slidably fitted to a guide rail 7 attached to a support plate 8 for the plate 6. The support plate 8 is coupled with a rack 9 (not shown in the drawings) and a pinion 10 to a mounting frame attached to the casing of the bonding apparatus, so that the support plate can be vertically moved. The pinion is engaged with a rack provided on a vertically moved rod coupled to a driving motor 11. A film holding member 12 for winding the leading edge portion of the stratified film IB is slidably fitted on a forward and backward guide rail on the support plate 8. A coupling and cutting-in member is provided on the film holding member 12. A coupling rod 13 is fitted in the coupling and cutting-in member and attached to a fixed cutting member support member 14 which supports a fixed cutting member 15 and 15A. A rotary cutting member 17 is rotatably supported by a rotary cutting member support member 16 and has a cutting edge obliquely extending at a prescribed angle. Air blowoff pipes 19 and 20 are provided over and under the rotary cutting member support member 16.

FIG. 2 shows heat and pressure bonding rollers 21, the base plate 22 for the printed circuit board, driving rollers 23A, driven rollers 23B, base plate holding units 24, and the film trailing edge holding members 25 which are hereinafter referred to as vacuum suction bars. Each of the base plate holding units 24 is made of a base plate holding roller 24A and a pneumatic cylinder 24B for the roller.

Each of the heat and pressure bonding rollers 21 may be described with reference to FIGS. 1, 3, 4A, 4B, 4C, 4D, 4E, 5, 6A and 6B from now on. R and L in the drawings denote the right-hand side and left-hand side thereof, respectively. A driving motor 101 is mounted under a heat and pressure bonding roller mounting rest 102 to which the heat and pressure bonding roller 21 is attached. The rotary shaft of the driving motor 101 rotatably extends through the left-hand side plate 102L of the mounting rest 102. The diameter of the hole of the plate 102L, through which the shaft of the motor 101 extends, is slightly larger than that of the shaft. A torque transmission gear A is secured to the rotary shaft of the motor 101. A rotary encoder 103 for detecting the rotational frequency of the motor 101 is secured to the side plate 102L. A torque transmission gear B is mounted on the rotary shaft of the encoder 103, and engaged with the preceding gear A. The rotational frequency of the motor 101 is detected by the encoder 103 through the gears A and B.

Figure 4A:
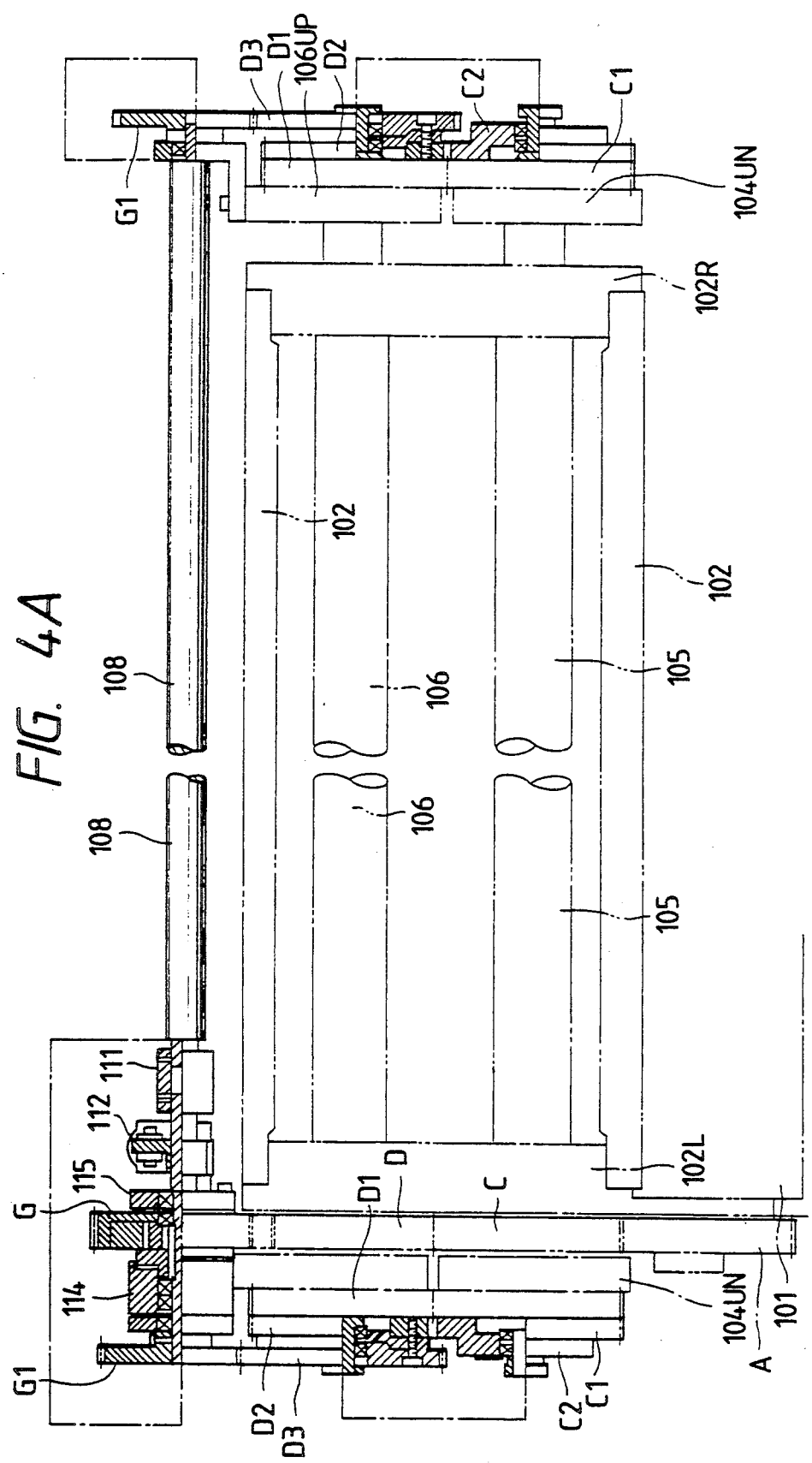
FIG. 4A is a cutaway front view of the section in the state that a heat and pressure bonding roller and a film trailing edge holding member are removed therefrom.
Figure 4B:
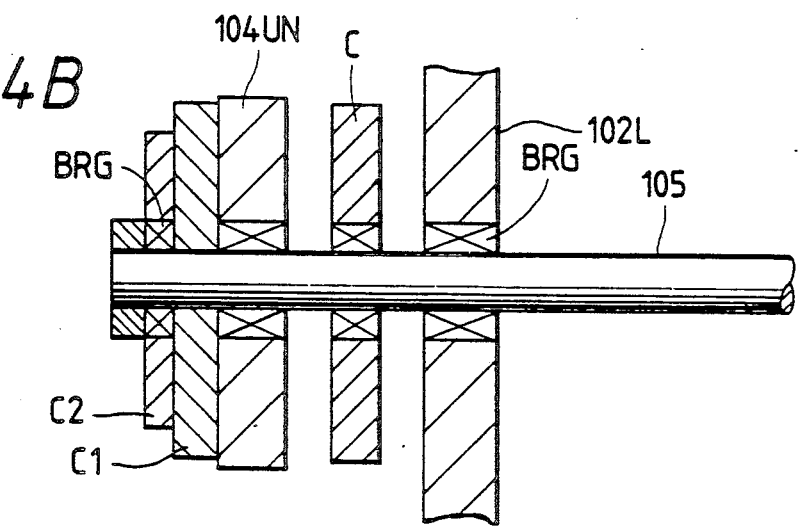
FIGS. 4B, 4C and 4D are views for describing the disposition of torque transmission gears and coupling bars.
Figure 4C:
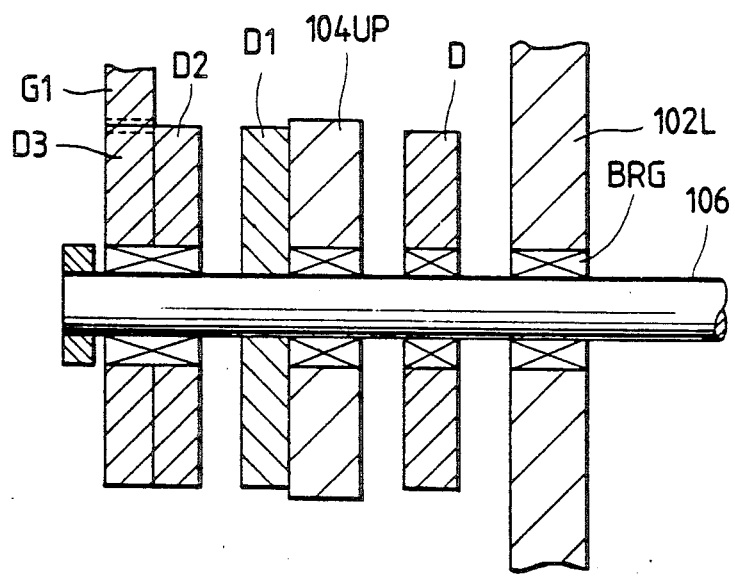
Figure 4D:
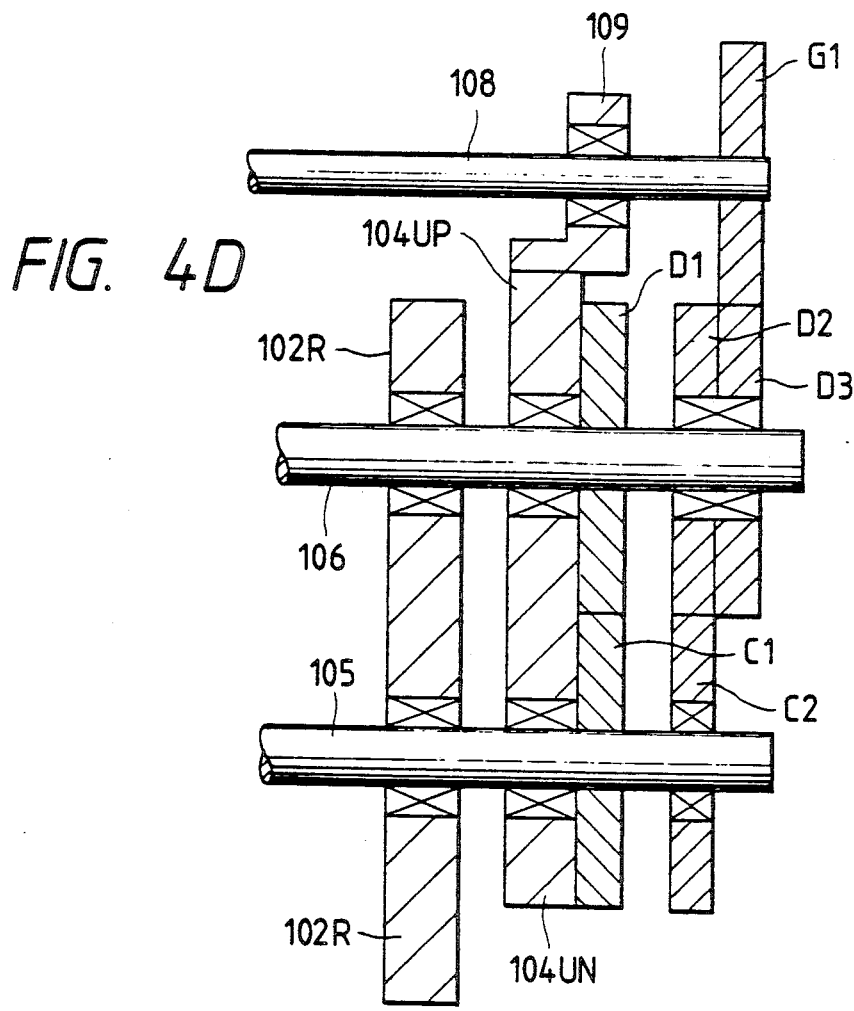

A torque transmission gear C is rotatably supported with a bearing BRG on a coupling bar 105 and engaged with the preceding gear A, as shown in FIGS. 4A, 4B and 4D. The coupling bar 105 extends through the side plates 102R and 102L of the heat and pressure bonding roller mounting rest 102 and heat and pressure bonding roller mounting lower members 104UN and is rotatably supported with bearings BRG by the side plate 102L and the roller mounting lower members. Torque transmission gears C1 are secured to the coupling bar 105. Torque transmission gears C2 are rotatably supported with bearings BRG on the bar 105.

A torque transmission gear D is rotatably supported with a bearing BRG on a coupling bar 106 and engaged with the torque transmission gear C, as shown in FIGS. 4C and 4D. The coupling bar 106 extends through the side plates 102R and 102L of the heat and pressure bonding roller mounting rest 102 and heat and pressure bonding roller mounting upper members 104UP and is rotatably supported with bearings BRG by the side plates and the roller mounting upper members. A torque transmission gear D is secured to the bar 106. Torque transmission gears D2 and D3 are rotatably supported with bearings BRG on the bar 106.

Each of the upper and the lower heat and pressure bonding rollers 21 includes a cylindrical body, and annular flanges secured to both the ends of the body by screws. A heater is provided in the cylindrical body. A shaft extends through the roller 21 and projects outward from the annular flanges at both the ends of the roller. The shaft supports the roller 21 rotatably with bearings provided in the annular flanges, and is secured to blocks attached to the heat and pressure bonding roller mounting members 104UP and 104UN. The left-hand annular flange of the lower heat and pressure bonding roller 21 is secured to a torque transmission gear E engaged with the torque transmission gear C. The left-hand annular flange of the upper heat and pressure bonding roller 21 is secured to a torque transmission gear F engaged with the torque transmission gear D.

Vacuum suction bar support members 107 and torque transmission gears H1 and H2 are supported with bearings on the extended portions of the above-mentioned shafts which support the heat and pressure bonding rollers 21 rotatably with the bearings. The vacuum suction bar support members 107 are secured to the upper and the lower torque transmission gears H1 and H2 by screws.

Figure 4E:
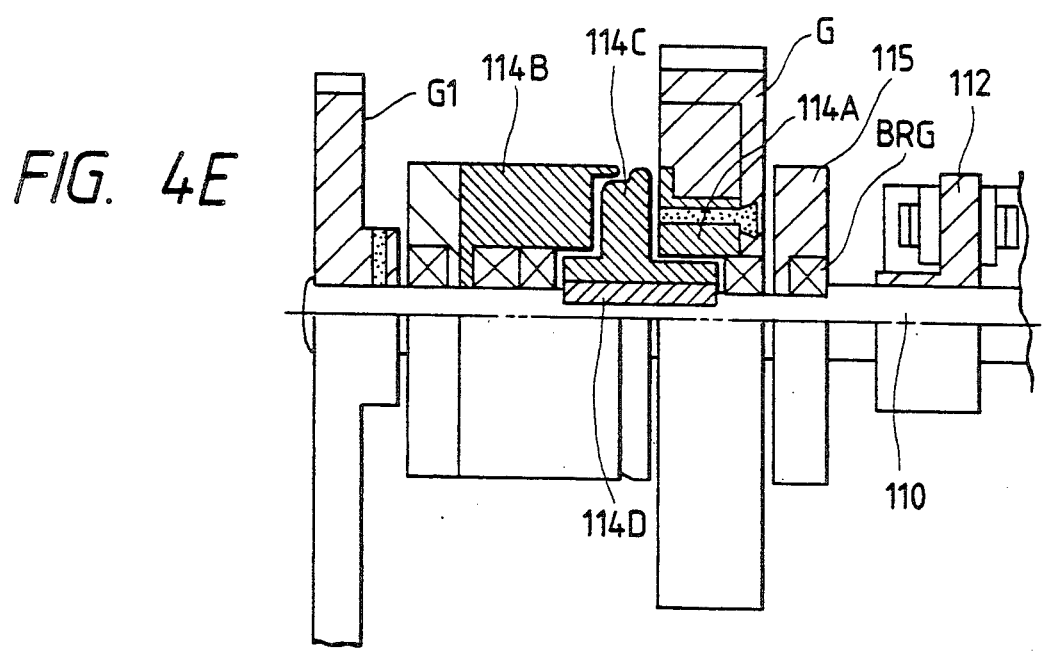
FIG. 4E is a detailed sectional view of an electromagnetic clutch shown in FIG. 1.
Figure 5:
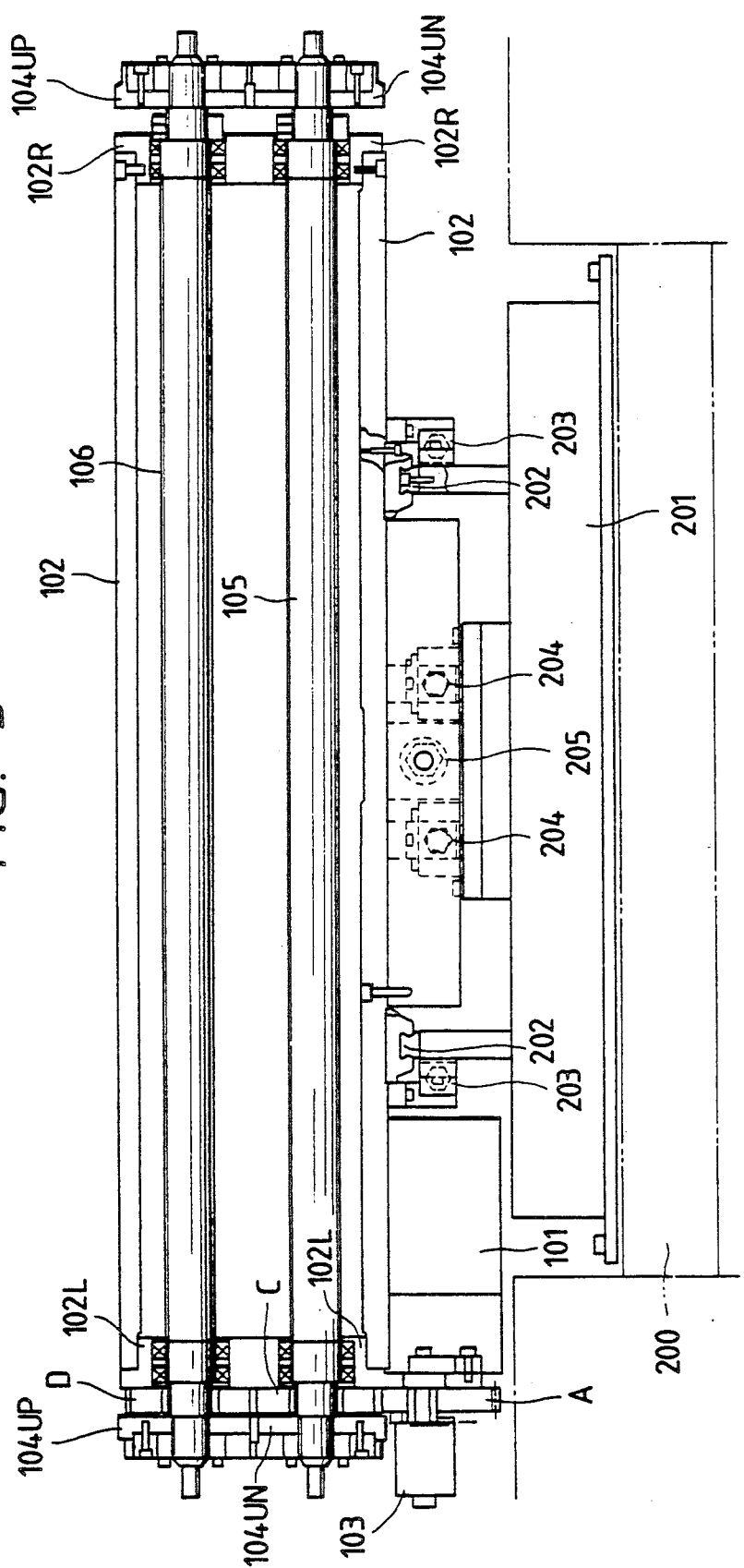
FIG. 5 is a sectional view of the section along a line (5)—(5) shown in FIG. 1.

A torque transmission gear G is mounted on the movable member 114A of an electromagnetic clutch 114, as shown in FIG. 4E. The movable member 114A and body 114B of the clutch 114 are rotatably supported with bearings on a coupling bar 110 so that the rotary member 114C of the clutch is located between the movable member and the body. The rotary member 114C is secured to the coupling bar 110 by a key 114D.

The right-hand end of the coupling bar 110 is coupled to the left-hand end of a coupling bar 108 by a coupling bar connector 111. The bar 108 is rotatably supported at the right-hand end thereof with a bearing BRG on a coupling bar support member 109 provided on the heat and pressure bonding roller mounting upper member 104UP. The bar 110 is rotatably supported at the left-hand end thereof with a bearing BRG on the support member 109.

A knuckle arm 112 is secured to the coupling bar 110 by a screw and coupled to the rod of a pneumatic cylinder 113 attached to a pneumatic cylinder mounting rest 115 secured to the coupling bar support member 109 by a screw and to the heat and pressure bonding roller mounting upper member 104UP by a screw.

When the electromagnetic clutch 114 is energized, the movable member 114A integrally coupled to the torque transmission gear G is electromagnetically locked to the rotary member 114C so that the gear is rigidly connected to the coupling bars 110 and 108. As a result, the torque of the gear D, which is the same as that of the heat and pressure bonding roller 21, is transmitted to the bars 110 and 108 through the gear G. When the clutch 114 is deenergized, the movable member 114A integrally coupled to the gear G is not electromagnetically locked to the rotary member 114C, so that the gear and the bar 110 are only separately located on the bearing BRG. At that time, the gear G is rotated by the torque of the gear D, which is the same as that of the roller 21, but the torque of the gear G is not transmitted to the bar 110.

Since the knuckle arm 112 is secured to the coupling bar 110 by the screw, the arm is rotated together with the bar when the vacuum suction bar 25 is closed. At that time, the rod of the pneumatic cylinder 113 coupled to the knuckle arm 112 is protruded so that when the vacuum suction bar 25 is closed, a limit switch is operated to de-energize the clutch 114 to stop the rotation of the coupling bar 110 or the movement of the vacuum suction bar. When the bonding of the film 1B to the base plate is completed, compressed air is introduced into the pneumatic cylinder 113 to reverse the rotation of the coupling bar 110 to put it back into the initial position thereof for the initial state that the vacuum suction bar 25 is opened. A torque transmission gear G1 is secured to the coupling bar 110 at the left-hand end thereof and connected to a torque transmission gear D2 through the electromagnetic clutch 114.

FIG. 7 shows a torque transmission system including all the torque transmission gears mentioned above.

The heat and pressure bonding roller mounting rest 102 is slidably supported by slide rails 202 and a rail support member 201 on the frame 200 of the casing of the bonding apparatus. Shock absorbers 203, which also serve as front stoppers, are provided under the slide rails 202 so that when the rod of a pneumatic cylinder 205 is protruded, the shock absorbers serve as front stoppers for the roller mounting rest 102 to slowly stop it. The cylinder 205 for sliding the rest 102 is provided at the middle point between the tops of the slide rails 202. Shock absorbers 204, which also serve as rear stoppers, are provided near both the sides of the pneumatic cylinder 205 so that when the rod of the cylinder is retracted, the shock absorbers serve as rear stoppers for the rest 102 to slowly stop it.

Figure 8A:
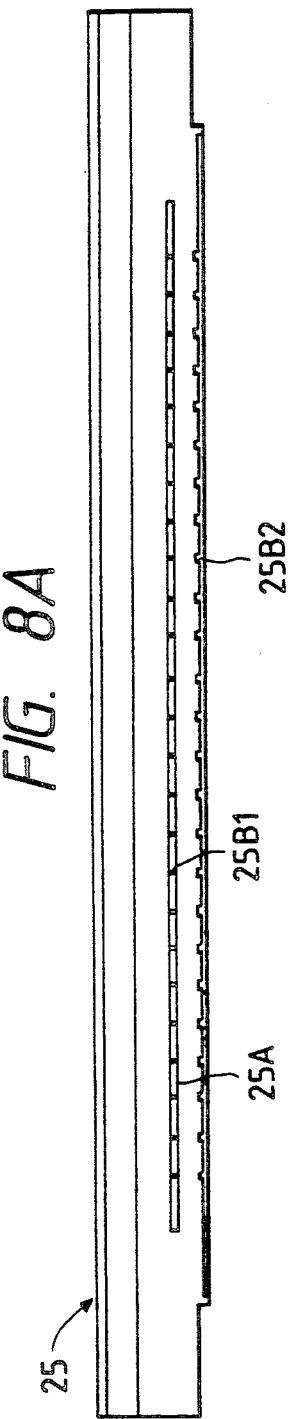
FIG. 8A is a front view of the film trailing edge holding member alone.
Figure 8B:
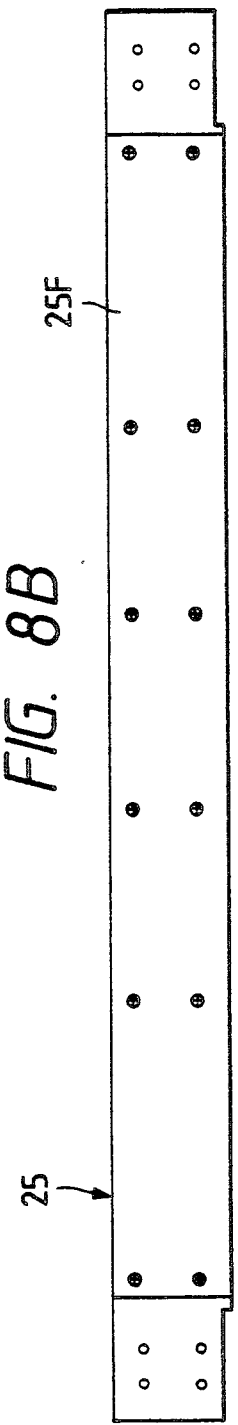
FIG. 8B is a rear view of the holding member alone.
Figure 8C:
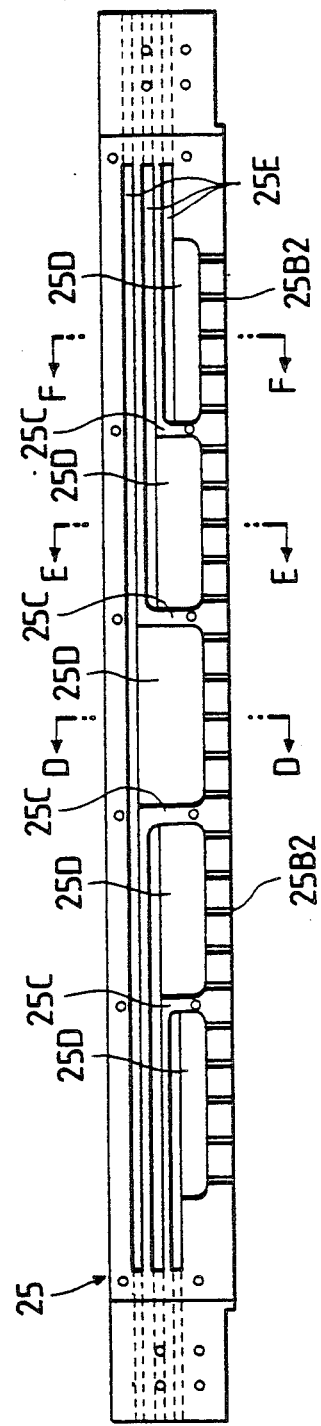
FIG. 8C is a rear view of the holding member in the state that an external air blocking plate is removed therefrom.
Figure 8D:
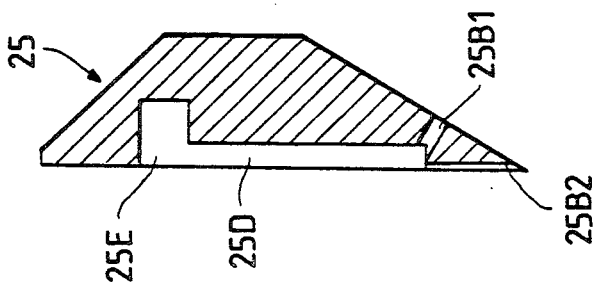
FIG. 8D is a sectional view of the holding member along a line (D)—(D) in FIG. 8C.
Figure 8E:
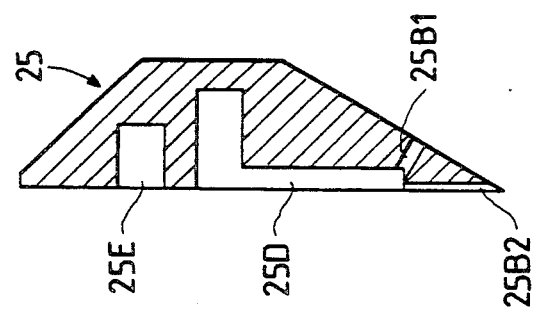
FIG. 8E is a sectional view of the holding member along a line (E)—(E) in FIG. 8C.
Figure 8F:
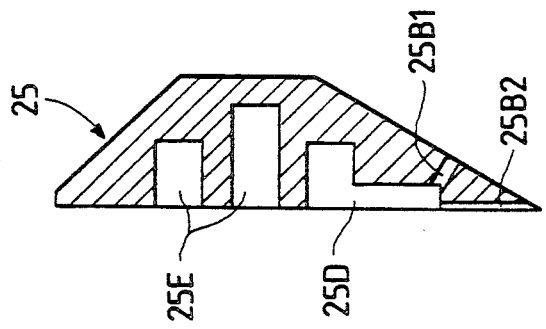
FIG. 8F is a sectional view of the holding member along a line (F)—(F) in FIG. 8C.
Figure 8G:
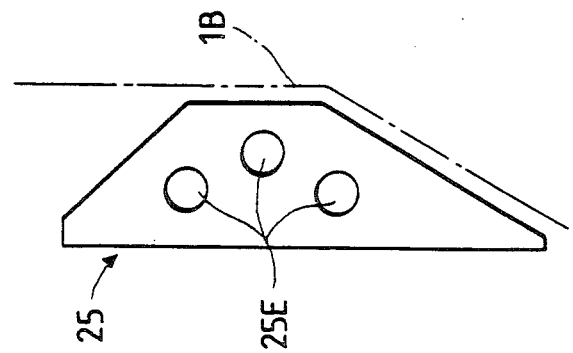
FIG. 8G is a left-hand side view of the holding member with regard to FIG. 8A.

The vacuum suction bar 25 is described in detail from now on. FIG. 8A is a front view of the bar 25 alone. FIG. 8B is a rear view of the bar 25. The external air blocking plate 25F is attached to the rear of the bar 25 by screws so as to block the external air from the interior of the bar. FIG. 8C is a rear view of the bar 25 in the state that the plate 25F is detached therefrom. The effective length of the bar 25 is not less than the maximum width of films to be bonded by the apparatus. The longitudinal edge portion of the bar 25, which is located nearer the film bonding position than the other longitudinal edge portion of the bar, is shaped as a wedge. The side of the bar 25, on which the film 1B is held by the bar, has a vacuum suction groove 25A and a film suction hole 25B2. A large number of film suction holes 25B1 are provided in the groove 25A. The film suction holes 25181 are provided in the groove 25A. The film suction holes 25B1 and 25B2 communicate with a plurality of internal chambers 25D defined by partition walls 25C and communicating with mutually-independent suction units through vacuum suction holes 25E. If the width of the film 1B is small, the suction units communicating with the lateral ones of the internal chambers 25D are blocked to be kept out of use. An internal chamber, which has vacuum suction holes communicating with a single suction unit and is divided into a plurality of small chambers to cope with various widths of films, may be provided instead of the internal chambers 25D. Since the bar 25 has the film suction holes 25B2 at the longitudinal edge of the bar nearer the film bonding position than the other longitudinal edge of the bar as shown in FIGS. 8C, 8D, 8E AND 8F, the yet-unbonded trailing edge portion of the cut-off stratified film 1B is securely sucked and held by the bar until the portion reaches a position in which the portion is sufficiently near the base plate conveyance passage.

The operation of the bonding apparatus is briefly described from now on. When it is detected by a base plate leading edge position sensor, which is provided near the base plate conveyance passage but not shown in the drawings, that the base plate 22 is conveyed to a film initial bonding position in which the film 1B is initially bonded to the base plate, the sensor sends out a detection signal so that the rotation of the driving rollers 23A are stopped. At the same time, the rotation of the base plate holding roller 24A is also stopped. Immediately after the leading edge of the base plate 22 has passed under the roller 24A, the pneumatic cylinder 24B for moving the roller is put into action on the basis of a detection signal so that the base plate is held by the base plate holding unit 24. As a result, the movement of the base plate 22 is surely stopped by the roller 24A so that the base plate does not move even if the leading end portion 6D of the main vacuum suction plate 6 comes into contact with the base plate. For that reason, the stratified film 1B can be initially bonded to the base plate 22 securely. The base plate 22 is held by the base plate holding roller 24A of the holding unit 24 until the heat and pressure bonding roller 21 comes into contact with the base plate. The pneumatic cylinder 24B for the roller 24A is put out of action synchronously with the contact of the bonding roller 21 with the base plate 22.

Figure 6A:
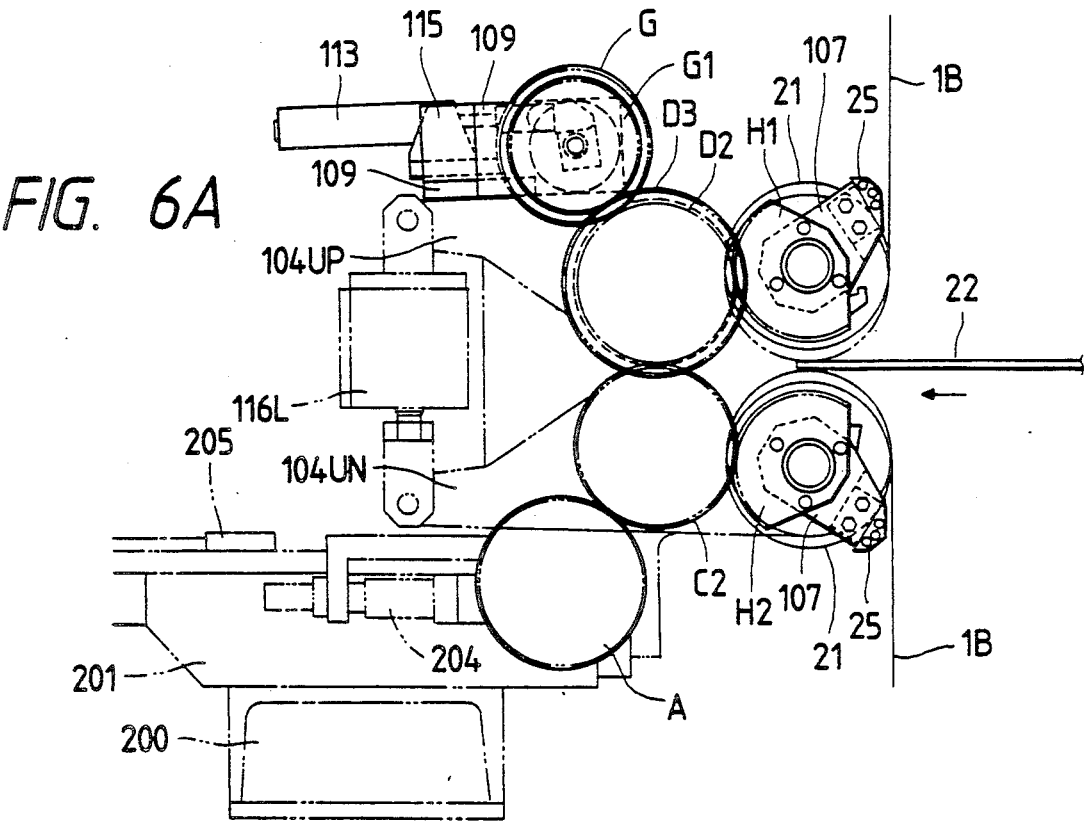
FIGS. 6A and 6B are views of the section seen along an arrow L1 shown in FIG. 1.
Figure 6B:
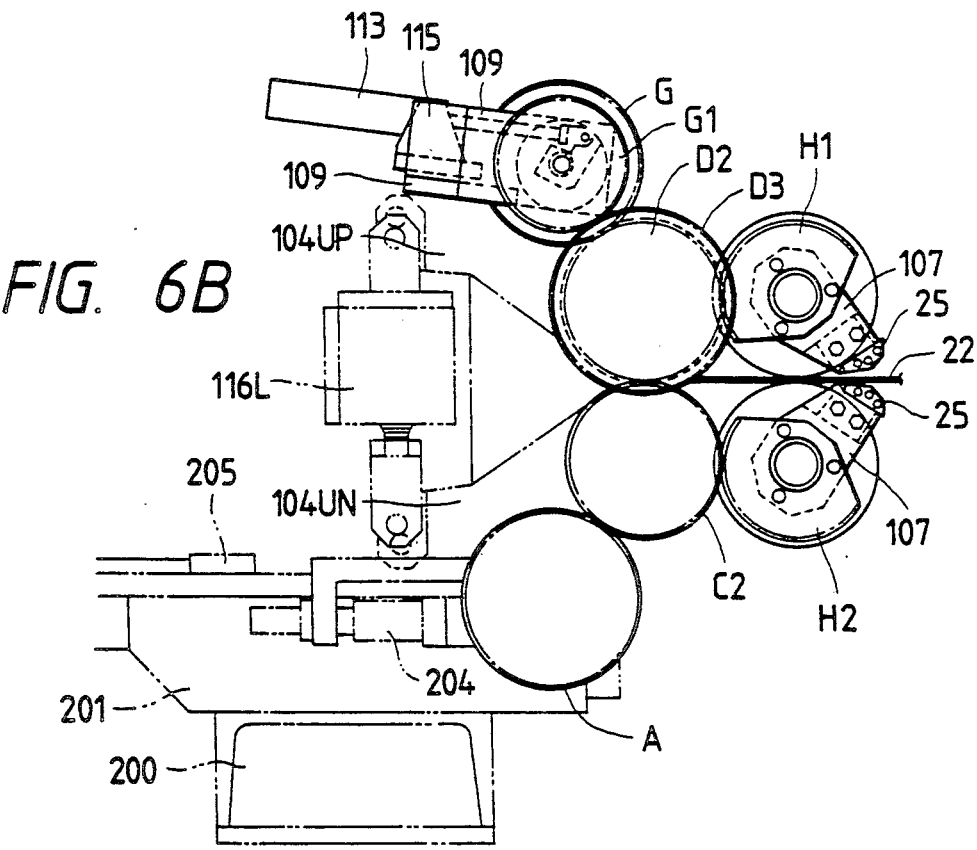

The operation of the heat and pressure bonding roller 21 and vacuum suction bar 25 of the bonding apparatus is described in detail from now on. The gears A, B, C, D, E, F and G are normally rotated by the driving motor 101. The film 1B is bonded to the base plate 22 by the rotating roller 21 while the base plate is moved forward. When the position of the trailing edge of the base plate 22 is detected by a base plate trailing edge sensor provided at a base plate conveyor, the sensor sends out a detecting signal so that a rotary cutter made of the fixed cutting member 15, the rotary cutting member support member 16 and the rotary cutting member 17 is put into action. As a result, the film 1B to be bonded to the base plate 11 is cut off to have the trailing edge thereof. When the trailing edge of the cut-off film 1B has reached a prescribed position near the vacuum suction bar 25, the electromagnetic clutch 114 is energized. For the energizing, a counter provided to control the clutch 114 but not shown in the drawings is supplied with pulses from the rotary encoder 103 connected to the driving motor 101. When the count of the counter has become a prescribed value, the clutch 114 is energized. Because of the energizing, the vacuum suction bar 25 is rotated around the heat and pressure bonding roller 21 in the same direction as the roller through the actions of the torque transmission gears G1, D3, D2, C2, H1 and H2. The rotation speed of the bar 25 is preset in terms of the tooth number ratio of the gears G1, D3, D2, C2, H1 and H2 so that the speed is less by 10% to 25% than the rotative circumferential velocity of the roller 21. The rotative circumferential velocity of the bar 25 is thus always kept in a prescribed relation to that of the roller 21 in terms of the tooth number ratio of the gears. When the rotative circumferential velocity of the roller 21 is increased due to some necessity, that of the bar 25 is automatically determined in terms of the unchanged tooth number ratio of the gears. During the rotation of the bar 25, the coupling bars 110 and 108 are rotated through the actions of the gears, and the rod of the pneumatic cylinder 113 is pulled out through the action of the knuckle arm 112 coupled to the coupling bar 108. When the bar 25 has come very near the base plate 22, the clutch 114 is de-energized so that the rotation of the bar is stopped. The state of the film trailing edge holding member section at this moment is shown in FIG. 6B. To de-energize the clutch 114, the position of the rear end of the rod of the pneumatic cylinder 113 is detected so that the limit switch is manipulated. When the trailing edge of the film 1B on the base plate 22 being moved forward and bonded with the film 1B has reached an imaginary straight line extending on the centers of the upper and the lower heat and pressure bonding rollers 21, the rollers are separated from the base plate 22 and the vacuum suction bars 25 begin to rotate reversely to that of the rollers so that each of the suction bars is returned to its initial position shown in FIG. 6A and is stopped in the position. A film bonding completion position determining counter not shown in the drawings is supplied with pulses from the rotary encoder 103 on the basis of the signal from the base plate trailing edge sensor not shown in the drawings. The above-mentioned separation of the upper and the lower heat and pressure bonding rollers 21 from the base plate 22 and the above-mentioned beginning of the rotation of the vacuum suction bars 25 in the reverse direction to that of the rollers are performed on the basis of a signal generated when the count of the counter has become a prescribed value. Pneumatic cylinders 116R and 116L are put into action on the basis of the signal so that the upper and the lower heat and pressure bonding rollers 21 are separated from each other to prescribed positions through the actions of the heat and pressure bonding roller mounting members 104UP and 104UN provided at both the ends of the cylinders. The cylinder 113 is put into action on the basis of the signal to pull in the rod of the cylinder so that the suction bar 25 is returned, through the actions of the knuckle arm 112 and the gears, to the initial position shown in FIG. 6A and is stopped in the position.

A film trailing edge holding member movement speed control apparatus for automatically changing the speed of the movement of the vacuum suction bars 25 depending on the rotative circumferential velocity of the heat and pressure bonding rollers 21 is thus provided. Therefore, the speed of the movement of the vacuum suction bar 25, which is the film trailing edge holding member, can be automatically changed depending on the rotative circumferential velocity of the heat and pressure bonding roller 21, to reduce the likelihood that an air bubble is made between the film 1B and the base plate 22 or that the film is wrinkled.

Since the vacuum suction bar 25 has the plural internal chambers 25D communicating with the mutually independent suction units through the vacuum suction holes 25E or has the internal chamber divided into the plural small internal chambers to cope with the various widths of films to be bonded by the apparatus, selected ones of the internal chambers can be put into sucking action depending on the width of the film 1B to be bonded to the base plate 11. For that reason, the trailing edge portion of the film 1B to be bonded to the base plate 11 can be held by the bar 25, regardless of the width of the film, to reduce the likelihood that an air bubble is made between the film and the base plate or that the film is wrinkled.

Since the effective length of the vacuum suction bar 25 is not less than the maximum width of the film 1B to be bonded to the base plate 11 by the apparatus and the longitudinal edge portion of the bar, which is located nearer the film bonding position than the other longitudinal edge portion of the bar, is shaped as a wedge, the bar can hold the trailing edge portion of the film 1B until the portion reaches a position nearer the heat and pressure bonding roller 21, to reduce the likelihood that an air bubble is made between the film and the base plate or that the film is wrinkled.

Figure 9:
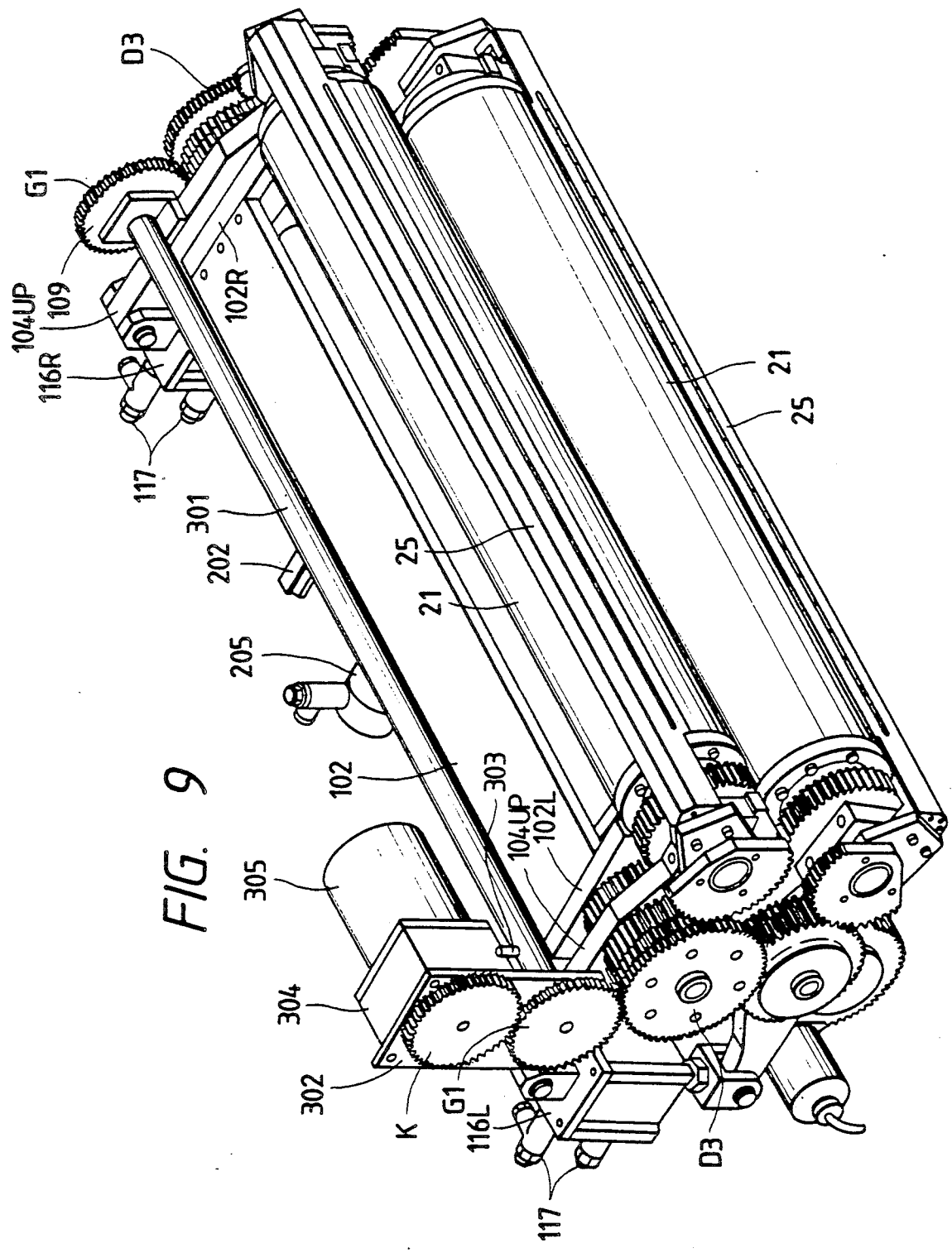
FIG. 9 is a perspective view of the heat and pressure bonding roller and film trailing edge holding member section of a bonding apparatus which is another embodiment of the present invention and by which stratified films each consisting of a photosensitive resin layer and a light-transmissible resin film are bonded, under heat and pressure, to a base plate for a printed circuit board.

FIG. 9 is a perspective view of the heat and pressure bonding roller and film trailing edge holding member section of a bonding apparatus which is the other of the embodiments and by which stratified films each consisting of a photosensitive resin layer and a light-transmissible resin film are bonded, under heat and pressure, to the top and bottom of a base plate for a printed circuit board. The section differs from that of the preceding bonding apparatus shown in FIG. 1, in the means for automatically changing the rotative circumferential velocity of the vacuum suction bar 25 depending on that of the heat and pressure bonding roller 21. In the means of the apparatus shown in FIG. 9, a coupling bar 301 is rotatably supported with bearings BRG on a coupling bar support member 302 provided on a heat and pressure bonding roller mounting upper member 104UP, instead of the coupling bars 108 and 110 in the mean of the apparatus which is shown in FIG. 1 and in which the coupling bar 108 is provided with the torque transmission gears G1 located at both the ends of the bar and engaged with the torque transmission gears D3. Torque transmission gears G1 are provided on the coupling bar 301 at both the ends thereof. A vacuum suction bar positioning member 303 is provided on the coupling bar 301. A motor 305 for moving a vacuum suction bar, which is a film trailing edge holding member, is attached with a gear box 304 to the coupling bar support member 302. The rotary shaft of the motor 305 is connected to a torque transmission gear K through torque transmission gears. The gear K is engaged with the left-hand torque transmission gear G1. The number of pulses from a rotary encoder 103 equivalent to that shown in FIG. 1 is converted, by a D/A converter, into a DC voltage corresponding to the number. The DC voltage is applied to a speed controller for the motor 305 to change the rotational frequency of the motor in terms of the voltage.

The operation of the heat and pressure bonding roller 21 and vacuum suction bar 25 of the bonding apparatus shown in FIG. 9 is described in detail with reference to FIG. 2 and 9 from now on. Gears A, B, C, D, E and F are normally rotated by a driving motor 101. The film 1B is bonded to the base plate 22 by the rotating roller 21 while the base plate is moved forward. The position of the trailing edge of the base plate 22 is detected by a base plate trailing edge sensor provided at a base plate conveyor, so that a detection signal is sent out from the sensor. A rotary cutter made of a fixed cutting member 15, a rotary cutting member support member 16 and a rotary cutting member 17 is put into action so that the film 1B to be bonded to the base plate 22 is cut off, thereby creating a trailing edge of the film. When the trailing edge of the film 1B has reached a prescribed position near the vacuum suction bar 25, the motor 305 for moving the bar 25 is put into action. On the basis of the detection signal mentioned above, a counter for controlling the motor 305 is supplied with the pulses from the rotary encoder 103 connected to the driving motor 101. When the count of the counter has become a prescribed value, the motor 305 is put into action as mentioned above. The number of the pulses counted by the counter at that time is applied to the D/A converter, from which the DC voltage is applied to the speed controller for the motor 305 so that the quantity of the action of the motor is determined depending on the voltage. Since the motor 305 is put into action, the vacuum suction bar 25 is rotated around the heat and pressure bonding roller 21 in the same direction as the roller through the actions of the torque transmission gears K, G1, D3, D2, C2, H1 and H2. The speed of the rotation of the bar 25 is preset to be slightly lower than that of the roller 21, by manipulating the speed change knob of the speed controller for the motor 305. A preset relationship is thus maintained between the rotation speed of the roller 21 and that of the bar 25. When the rotation speed of the roller 21 is increased due to some necessity, that of the bar 25 is automatically set so that the preset relationship is still maintained. During the rotation of the bar 25, the coupling bar 301 is rotated through the actions of the gears so that the vacuum suction bar positioning member 303 attached to the bar is also rotated. The rotation of the positioning member 303 is detected by a position sensor not shown in the drawings. When the vacuum suction bar 25 has come very near the base plate 22, the rotation of the motor 305 is stopped on the basis of a detection signal from the position sensor so that the rotation of the bar is stopped. When the trailing edge of the film 1B on the base plate 22 being moved forward and bonded with the film by the heat and pressure bonding roller 21 has reached an imaginary straight line extending on the centers of the upper and the lower bonding rollers 21, the rollers are separated from the base plate and the bar 25 begins to rotate in the reverse direction to the rotation of the roller so that the bar is returned to its initial position shown in FIG. 6A and is stopped in the position. On the basis of the detection signal from the base plate trailing edge sensor, a film bonding completion position determining counter is supplied with the pulses from the rotary encoder 103. The above-mentioned separation of the upper and the lower bonding rollers 21 from the base plate 22 and the above-mentioned beginning of the rotation of the bar 25 in the reverse direction to that of the roller are performed on the basis of a signal generated by the bonding completion position determining counter when the count of the counter has become a prescribed value. Pneumatic cylinders 116R and 116L are put into action on the basis of the signal so that the upper and the lower bonding rollers 21 are separated from each other to prescribed positions through the actions of the heat and pressure bonding roller mounting members 104UP and 104UN provided at both the ends of the cylinders. The motor 305 for moving the vacuum suction bar 25 is rotated in reverse on the basis of the signal to rotate the coupling bar 301 in reverse so that the vacuum suction bar is returned, through the actions of the gears, to the initial position shown in FIG. 6A and is stopped in the position.

It is understood from the above description that the bonding apparatus partly shown in FIG. 9 produces the same effects as that partly shown in FIG. 1, although the apparatus partly shown in FIG. 9 is simpler in constitution than that partly shown in FIG. 1.

Since the rotation speed of the vacuum suction bar 25 can be changed without altering the tooth number ratio of the gears, the bonding apparatus can be easily manufactured.

Although the heat and pressure bonding rollers are provided in the embodiments, the present invention is not confined thereto but may be otherwise embodied so that pressure bonding rollers of any type are used.

The present invention is not confined to the embodiments, but may be practiced or embodied in other various ways without departing from the spirit or essential character thereof.

According to the present invention, a film trailing edge holding member movement speed control means for automatically changing the speed of the movement of a film trailing edge holding member depending on the rotative circumferential velocity of a pressure bonding roller is provided. For that reason, the speed of the movement of the holding member can be automatically changed depending on the rotative circumferential velocity of the roller. Since a film to be bonded to a base plate can be sucked by selected ones of the internal chambers of the holding member depending on the width of the film, the film can be held by the member regardless of the width of the film. Since the effective length of the holding member is not less than the maximum width of films to be bonded and the longitudinal edge portion of the member is shaped as a wedge, the member can hold the trailing edge of the film until the trailing edge reaches a position nearer the position of the bonding of the film. For these reasons, there is small likelihood that an air bubble is made between the film and the base plate or that the film is wrinkled.

What is claimed:

1. A film bonding apparatus comprising:
 a pressure bonding roller having a peripheral surface and being rotatable at a circumferential velocity, said roller being provided so that a film cut to a length corresponding to that of a base plate is bonded to the film bonding surface of said plate by said roller;
 a film trailing edge holding member rotatably supported near the peripheral surface of said roller, said member holding the trailing edge portion of said film cut to said length and being moveable to a position near the mutual contact surfaces of said roller and said film on said plate, at a speed equal to or slightly less than the rotative circumferential velocity of said roller; and
 film trailing edge holding member movement speed control means for automatically changing the speed of the movement of said member depending on the rotative circumferential velocity of said roller, wherein said film trailing edge holding member comprises a rotary shaft from rotatably supporting said holding member, said movement speed control means comprises first gears for driving the pressure bonding roller, second gears engaged with said first gears so as to move the film trailing edge holding member, and a coupling means for coupling and uncoupling said rotary shaft of said holding member to at least one of said first and second gears so that said shaft can be selectively uncoupled from said holding member moving gears.

2. The invention of claim 1 wherein the rotative circumferential velocity of said holding member is kept in a prescribed relation to that of the roller in terms of the tooth number ratio of said gears.

* * * * *